United States Patent
Shoji et al.

(10) Patent No.: US 8,835,566 B2
(45) Date of Patent: Sep. 16, 2014

(54) RUBBER COMPOSITION FOR VULCANIZATION

(75) Inventors: Shigeru Shoji, Osaka (JP); Toyofumi Otaka, Osaka (JP); Toshiyuki Funayama, Osaka (JP); Yasushi Hamura, Osaka (JP)

(73) Assignee: Daiso Co., Ltd., Osaka-shi (JP)

(*) Notice: Subject to any disclaimer, the term of this patent is extended or adjusted under 35 U.S.C. 154(b) by 1096 days.

(21) Appl. No.: 12/446,506

(22) PCT Filed: Oct. 26, 2007

(86) PCT No.: PCT/JP2007/070906
§ 371 (c)(1),
(2), (4) Date: Nov. 5, 2010

(87) PCT Pub. No.: WO2008/050859
PCT Pub. Date: May 2, 2008

(65) Prior Publication Data
US 2011/0160344 A1    Jun. 30, 2011

(30) Foreign Application Priority Data
Oct. 27, 2006    (JP) .................. 2006-291939

(51) Int. Cl.
C08L 71/03    (2006.01)
C08K 5/39    (2006.01)
C08K 3/26    (2006.01)
C08K 5/09    (2006.01)
C08K 5/3465    (2006.01)

(52) U.S. Cl.
CPC .. *C08K 5/39* (2013.01); *C08L 71/03* (2013.01)
USPC ............................ 525/187; 524/201; 524/100

(58) Field of Classification Search
CPC .................................. C08L 71/03; C08K 5/39
USPC ....................................................... 525/187
See application file for complete search history.

(56) References Cited

U.S. PATENT DOCUMENTS

| | | | |
|---|---|---|---|
| 3,876,590 A | 4/1975 | Shimogawa et al. | |
| 4,511,698 A | 4/1985 | Matoba et al. | |
| 4,594,396 A * | 6/1986 | Berta ............................ | 525/352 |
| 6,106,914 A | 8/2000 | Kanbe et al. | |
| 6,949,606 B1 * | 9/2005 | Nishimura et al. ............ | 525/208 |
| 2002/0193472 A1 * | 12/2002 | Jancis ............................ | 524/96 |
| 2004/0180995 A1 * | 9/2004 | Enlow et al. .................. | 524/93 |
| 2006/0128857 A1 * | 6/2006 | Otaka et al. ................... | 524/322 |
| 2006/0216518 A1 * | 9/2006 | Funayama et al. ............ | 428/413 |

FOREIGN PATENT DOCUMENTS

| | | | |
|---|---|---|---|
| EP | 1170331 A1 | 1/2002 | |
| EP | 1203787 A1 | 5/2002 | |
| EP | 1704994 A1 | 9/2006 | |
| GB | 1311328 A | 3/1973 | |
| JP | 48-6179 | 2/1973 | |
| JP | 48-6180 | 2/1973 | |
| JP | 61-174258 A | 8/1986 | |
| JP | 2000-313769 A | 11/2000 | |
| JP | 2000-313769 A | * 11/2000 | |
| JP | 2004-107540 A | 4/2004 | |
| JP | 2004-107540 A | * 4/2004 | |
| JP | 2005-002182 A | 1/2005 | |
| JP | 2005-350634 A | 12/2005 | |
| JP | 2006-096866 A | 4/2006 | |
| JP | 2006-176763 A | 7/2006 | |

OTHER PUBLICATIONS

Supplementary European Search Report dated Jan. 2, 2012, issued in the corresponding European patent application No. 07830640.4.
International Search Report dated Dec. 18, 2007, issued on PCT/JP2007/070906.

* cited by examiner

*Primary Examiner* — Randy Gulakowski
*Assistant Examiner* — Ha Nguyen
(74) *Attorney, Agent, or Firm* — Edwards Wildman Palmer LLP

(57) ABSTRACT

The present invention provides a vulcanized rubber material having improved heat resistance while maintaining ozone resistance of an epihalohydrin rubber, and a rubber composition for vulcanization for producing the same. The invention further provides a vulcanized rubber material and a rubber composition for vulcanization, that can achieve the above objects without using an organonickel compound having a concern about toxicity, or if used, using the same as less as possible. The present invention relates to a rubber composition for vulcanization comprising (a) 100 parts by weight of an epihalohydrin rubber, (b) 0.01 to 0.5 part by weight of a copper salt of dithiocarbamic acid, (c) an acid acceptor, and (d) a polythiol type vulcanizing agent or a polyol type vulcanizing agent, a vulcanized rubber material obtained by vulcanizing the composition, and an automotive rubber part comprising the vulcanized rubber material.

17 Claims, No Drawings

RUBBER COMPOSITION FOR VULCANIZATION

TECHNICAL FIELD

The present invention relates to a rubber composition for vulcanization comprising an epihalohydrin rubber having improved heat resistance as a base, and a vulcanized rubber material obtained by vulcanizing the composition.

Epihalohydrin rubber materials are widely used as fuel hose, air hose and tube materials in automotive applications utilizing its heat resistance, oil resistance, ozone resistance and the like. However, requirement in improvement of heat resistance to rubber materials becomes severe year by year with implementation of countermeasure to emission control and energy saving countermeasure in recent years, increase of temperature in engine room due to high performance and compactification of engine, maintenance-free automobile parts, and the like.

Behaviors of various metal salts of dithiocarbamic acid when those were added to a styrene-butadiene copolymer rubber (SBR) are already known. It is described that of those metal salts, only a nickel salt of dithiocarbamic acid acts as an antioxidant capable of improving heat resistance and ozone resistance of synthetic rubbers (NIPPON GOMU KYOKAI-SHI (the Journal of SRIJ), vol. 37, 5 (1964), p 333-340).

Furthermore, a method of vulcanizing epihalohydrin rubber by combining various metal salts of dithiocarbamic acid with thioureas and the like is proposed (JP-B-48-6179 and JP-B-48-6180). In this case, various metal salts of dithiocarbamic acid act as a vulcanization accelerator.

In epihalohydrin rubbers, organonickel compounds, particularly nickel dibutyldithiocarbamate, have widely been used as an antioxidant effective to improve heat resistance and ozone resistance. However, in recent years, organonickel compounds begin to have a concern about toxicity, and an antioxidant having excellent heat resistance and ozone resistance is demanded without using organonickel compounds in epihalohydrin rubbers, or if used, using the same as less as possible.

For example, a method of using a hindered amine light stabilizer (JP-A-2005-2182), a method of using a cobalt salt of dithiocarbamic acid (JP-A-2005-350634), a method of using a molybdenum salt of dithiocarbamic acid (JP-A-2006-96866), and a method of using a metallic soap (JP-A-2006-176763) are proposed as methods for improving heat resistance of epihalohydrin rubbers without using organonickel compounds.

On the other hand, general vulcanizing agents that can vulcanize epihalohydrin rubbers include thioureas, mercaptotriazines and quinoxalines, and those are appropriately selected according to properties of rubber materials required, such as storage stability, mechanical properties, compression set, ozone resistance, cold resistance and oil resistance, processing method of rubber materials, economical efficiency of a vulcanizing agent, and the like. Furthermore, magnesium oxide, lead compound, zinc oxide, synthetic hydrotalcite, hydrated lime, calcined lime or the like is appropriately selected as an acid acceptor according to the vulcanizing agent used.

DISCLOSURE OF THE INVENTION

Problems that the Invention is to Solve

However, heat resistance is not yet satisfactory in the epihalohydrin rubber compositions of those prior arts, and further improvement in heat resistance while maintaining sufficient ozone resistance is required.

In view of the above actual situation, objects of the present invention are to provide a vulcanized rubber material having improved heat resistance while maintaining ozone resistance of an epihalohydrin rubber, and a rubber composition for vulcanization for producing the same. The invention further provides a vulcanized rubber material that can achieve the above object without using an organonickel compound having a concern about toxicity, or if used, using the same as less as possible, and a rubber composition for vulcanization.

Means for Solving the Problems

As a result of various investigations to solve the above problems, the present inventors have found that heat resistance can be improved while sufficiently maintaining ozone resistance by adding a given amount of a copper salt of dithiocarbamic acid to a rubber composition for vulcanization comprising an epihalohydrin rubber, a polythiol or polyol type vulcanizing agent and an acid acceptor. Furthermore, they have further found that heat resistance and ozone resistance of an epihalohydrin rubber vulcanizate can further be improved by further adding a benzimidazole type antioxidant and a hindered amine light stabilizer to the composition. Additionally, they have found that the composition according to the invention can achieve the improvement in ozone resistance and heat resistance of an epihalohydrin rubber without using an organonickel compound having a concern about toxicity.

The invention relates to a rubber composition for vulcanization comprising (a) 100 parts by weight of an epihalohydrin rubber, (b) 0.01 to 0.5 part by weight of a copper salt of dithiocarbamic acid, (c) an acid acceptor, and (d) a polythiol type vulcanizing agent or a polyol type vulcanizing agent, a vulcanized rubber material obtained by vulcanizing the composition, and an automotive rubber part comprising the vulcanized rubber material.

Furthermore, when (e) a benzimidazole type antioxidant and/or (f) a hindered amine light stabilizer, and (g) a sodium salt of fatty acid and/or a potassium salt of fatty acid as a vulcanization accelerator are added to the composition of the invention, heat resistance and ozone resistance of the epihalohydrin rubber vulcanizate obtained can further be improved.

Advantage of the Invention

The present invention can provide an epihalohydrin vulcanized rubber material having improved heat resistance and ozone resistance, and a rubber composition for vulcanization for producing the material. Furthermore, the invention can provide a rubber composition for vulcanization having the properties without using an organonickel compound having a concern about toxicity, or if used, using the same as less as possible, and its vulcanized rubber material.

MODE FOR CARRYING OUT THE INVENTION

The present invention is described in detail below. The epihalohydrin rubber (a) in the invention means an epihalohydrin homopolymer or a copolymer between epihalohydrin and other epoxide copolymerizable with epihalohydrin, such as ethylene oxide, propylene oxide or allyl glycidyl ether. Examples of those include epichlorohydrin homopolymer, epibromohydrin homopolymer, epichlorohydrin-ethylene oxide copolymer, epibromohydrin-ethylene oxide copolymer, epichlorohydrin-propylene oxide copolymer, epibromohydrin-propylene oxide copolymer, epichlorohydrin-ethylene oxide-allyl glycidyl ether terpolymer, epibromohydrin-ethylene oxide-allyl glycidyl ether terpolymer, epichlorohydrin-ethylene oxide-propylene oxide-allyl glycidyl ether quaterpolymer, and epibromohydrin-ethylene oxide-propylene oxide-allyl glycidyl ether quaterpolymer. Epichlorohydrin homopolymer, epichlorohydrin-ethylene oxide copolymer and epichlorohydrin-ethylene oxide-allyl glycidyl ether terpolymer are preferred, and epichlorohydrin-ethylene oxide copolymer and epichlorohydrin-ethylene oxide-allyl glycidyl ether terpolymer are more preferred.

In the case of epibromohydrin-ethylene oxide copolymer and epichlorohydrin-ethylene oxide-allyl glycidyl ether terpolymer, the proportions of those copolymer components are, for example, that epichlorohydrin is from 5 to 95 mol %, preferably from 10 to 75 mol %, and further preferably from 10 to 65 mol %, ethylene oxide is from 5 to 95 mol %, preferably from 25 to 90 mol %, and further preferably from 35 to 90 mol %, and allyl glycidyl ether is from 0 to 10 mol %, preferably from 1 to 8 mol %, and further preferably from 1 to 7 mol %.

Molecular weight of the homopolymer or copolymer is not particularly limited, and is generally $ML_{1+4}$ (100° C.)=about 30 to 150 by Mooney viscosity representation.

In the case that an epichlorohydrin homopolymer or a blend of an epichlorohydrin homopolymer and other epihalohydrin rubber, containing 70 parts by weight or more of the epichlorohydrin homopolymer is applied as an epihalohydrin rubber to the invention, particularly excellent heat resistance is obtained.

The copper salt (b) of dithiocarbamic acid which is one component of the rubber composition for vulcanization by the invention is generally used as a vulcanization accelerator of a diene rubber, but acts as an antioxidant in the composition of the invention. The copper salt of dithiocarbamic acid is represented by the following general formula (I):

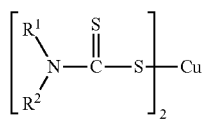

(I)

wherein $R^1$ and $R^2$ which are the same or different represent hydrogen atom, an alkyl group, an aralkyl group or an aryl group.

An alkyl group preferred as $R^1$ and $R^2$ is an alkyl group having from 1 to 10 carbon atoms, such as methyl group, ethyl group, propyl group, butyl group, pentyl group or isononyl group. $R^1$ and $R^2$ may be combined to form an alkylene group having from 1 to 10 carbon atoms, such as pentamethylene group or hexamethylene group. An aralkyl group preferred as $R^1$ and $R^2$ is an aralkyl group having from 1 to 10 carbon atoms, such as benzyl or phenethyl. An aryl group preferred as $R^1$ and $R^2$ is an aryl group having from 1 to 10 carbon atoms, such as phenyl or tosyl.

Preferred examples of the copper salt of dithiocarbamic acid used in the invention include copper dimethyl dithiocarbamate, copper diethyl dithiocarbamate, copper dibutyl dithiocarbamate, copper N-ethyl-N-phenyl dithiocarbamate, copper N-pentamethylene dithiocarbamate and copper dibenzyl dithiocarbamate. The copper salts of dithiocarbamate may be used alone or as mixtures of two or more thereof.

The adding amount of the copper salt of dithiocarbamic acid is from 0.01 to 0.5 part by weight, preferably from 0.01 to 0.3 part by weight, further preferably from 0.01 to 0.1 part by weight, and particularly preferably from 0.05 to 0.1 part by weight, per 100 parts by weight of the epihalohydrin rubber. Where the adding amount is less than the range, the effect of improving heat resistance is small, and where the adding amount exceeds the range, ozone resistance may be deteriorated.

The acid acceptor (c) used in the invention can use the conventional acid acceptors. The acid acceptor (c) is preferably a metal compound and/or inorganic microporous crystal.

The metal compound includes metal compounds such as oxides, hydroxides, carbonates, carboxylates, silicates, borates or phosphites of metals of group II (group 2 and group 12) in the periodic table; oxides, hydroxides, carboxylates, silicates, sulfates, nitrates or phosphates of metals of group III (group 3 and group 13) in the periodic table; and oxides, basic carbonates, basic carboxylates, basic phosphites, basic sulfites or tribasic sulfates of metals of group IV (group 4 and group 14) in the periodic table.

Specific examples of the metal compound include magnesia, magnesium hydroxide, aluminum hydroxide, barium hydroxide, sodium carbonate, magnesium carbonate, barium carbonate, calcined lime, hydrated lime, calcium carbonate, calcium silicate, calcium stearate, zinc stearate, calcium phthalate, calcium phosphite, zinc white, tin oxide, litharge, red lead, lead white, dibasic lead phthalate, dibasic lead carbonate, tin stearate, basic lead phosphite, basic tin phosphite, basic lead sulfite, and tribasic lead sulfate. Sodium carbonate, magnesia, magnesium hydroxide, calcined lime, hydrated lime, calcium silicate, zinc white and the like are preferred from the standpoint that a compound having a concern of toxicity is not used, which is the gist of the invention. Furthermore, from the standpoint of vulcanization rate, sodium carbonate is preferred in the case of applying the polyol type vulcanizing agent to the composition of the invention, and magnesia, calcined lime, hydrated lime and the like are preferred in the case of applying the polythiol type vulcanizing agent to the composition of the invention.

In the case of using the polythiol type vulcanizing agent as a vulcanizing agent, inorganic microporous crystal is preferred as an acid acceptor. The inorganic microporous crystal means a crystalline porous body having fine openings, and can clearly be distinguished from an amorphous porous body such as silica gel and alumina. Examples of the inorganic microporous crystal include zeolites, aluminophosphate molecular sieve, layered silicate, synthetic hydrotalcite, titanic acid alkali metal salt and Li—Al clathrate compound. Particularly preferred acid acceptor includes synthetic hydrotalcite.

Zeolites include various zeolites such as natural zeolite, A type, X type and Y type synthetic zeolites, sodalites, natural or synthetic mordenite and ZSM-5, and their metal substitutes. Those may be used alone or as mixtures of two or more thereof. Further, metal of the metal substitutes is mostly sodium. Zeolites having large acid recipient ability are preferred, and A type zeolite is preferred.

The synthetic hydrotalcite is represented by the following general formula (II):

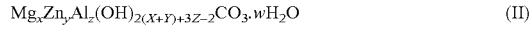

(II)

wherein x and y are an actual number of from 0 to 10, provided that x+y is from 1 to 10; z is an actual number of from 1 to 5; and w is an actual number of from 0 to 10.

Examples of the hydrotalcites include the following compounds.

$Mg_{4.5}Al_2(OH)_{13}CO_3.3.5H_2O$ $Mg_{4.5}Al_2(OH)_{13}CO_3$ $Mg_4Al_2(OH)_{12}CO_3.3.5H_2O$ $Mg_6Al_2(OH)_{16}CO_3.4H_2O$ $Mg_5Al_2(OH)_{14}CO_3.4H_2O$ $Mg_3Al_2(OH)_{10}CO_3.1.7H_2O$ $Mg_3ZnAl_2(OH)_{12}CO_3.wH_2O$ $Mg_3ZnAl_2(OH)_{12}CO_3$

The Li—Al clathrate compound is represented by the following general formula (III):

$$[Al_2Li(OH)_6]_nX.mH_2O \qquad (III)$$

wherein X represents an inorganic or organic anion, n is valency of anion X, and m is an integer of 3 or less.

The adding amount of the acid acceptor is from 0.2 to 50 parts by weight, for example, from 0.5 to 50 parts by weight, and particularly from 1 to 20 parts by weight, per 100 parts by weight of the epihalohydrin rubber. Where the adding amount is less than the range, crosslinking becomes insufficient. On the other hand, the adding amount exceeds the range, vulcanizate is too rigid, and properties generally expected as an epihalohydrin rubber vulcanizate are not obtained. Furthermore, the microporous crystal and the metal compound such as metal oxide may be used separately or in combination.

The invention uses (d) the polythiol type vulcanizing agent or the polyol type vulcanizing agent.

The polythiol type vulcanizing agent used in the invention is a compound having at least two thiol groups in the molecule, or a compound which forms at least two thiol groups by heating. Examples of the polythiol type vulcanizing agent include triazine type vulcanizing agent, thiadiazole type vulcanizing agent, quinoxaline type vulcanizing agent and pyrazine type vulcanizing agent. Triazine type vulcanizing agent or quinoxaline type vulcanizing agent is preferred.

The triazine type vulcanizing agent includes 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine and 1-phenylamino-3,5-dimercaptotriazine. The triazine type vulcanizing agent is preferably 2,4,6-trimercapto-s-triazine.

The quinoxaline type vulcanizing agent includes 2,3-dimercaptoquinoxaline, quinoxaline-2,3-dithiocarbonate, 6-methylquinoxaline-2,3-dithiocarbonate and 5,8-dimethylquinoxaline-2,3-dithiocarbonate.

On the other hand, the polyol type vulcanizing agent is a compound having at least two hydroxyl groups in the molecule, and preferred examples thereof include bisphenol AF and bisphenol S.

The adding amount of the polythiol type vulcanizing agent and the polyol type vulcanizing agent is from 0.1 to 10 parts by weight, and preferably from 0.3 to 5 parts by weight, per 100 parts by weight of the epihalohydrin rubber. Where the adding amount is less than the range, crosslinking becomes insufficient. On the other hand, where the adding amount exceeds the range, vulcanizate is too rigid, and properties generally expected as an epihalohydrin rubber vulcanizate are not obtained. Particularly preferred vulcanizing agent is 6-methylquinoxaline-2,3-dithiocarbonate. The vulcanizing agents may be used alone or as mixtures of two or more thereof.

The conventional accelerators (that is, vulcanization accelerators) that are generally used together with those polyol type vulcanizing agent and polythiol type vulcanizing agent, retarders and the like can directly be used in the rubber composition for vulcanization of the invention. Examples of the accelerator include sulfur, morpholine sulfides, amines, weak acid salts of amine, basic silica, quaternary ammonium salts, quaternary phosphonium salts and alkali metal salts of fatty acid. Particularly preferred accelerator in the case of applying the quinoxaline type vulcanizing agent to the composition of the invention includes 1,8-diazabicyclo(5,4,0)undecene-7 (hereinafter referred to as "DBU") salts, 1,5-diazabicyclo(4,3,0)nonene-5 (hereinafter referred to as "DBN") salts, basic silica and alkali metal salts of fatty acid.

The DBU salts include DBU-carbonates, DBU-stearates, DBU-2-ethylhexylates, DBU-benzoates, DBU-salicylates, DBU-3-hydroxy-2-naphthoates, DBU-phenol resin salts, DBU-2-mercaptobenzothiazole salts and DBU-2-mercaptobenzimidazole salts. The DBN salts include DBN-carbonates, DBN-stearates, DBN-2-ethylhexylates, DBN-benzoates, DBN-salicylates, DBN-3-hydroxy-2-naphthoates, DBN-phenol resin salts, DBN-2-mercaptobenzothiazole salts and DBN-2-mercaptobenzimidazole salts. The adding amount in the case using those DBU salts and/or DBN salts as an accelerator is from 0.1 to 5 parts by weight, for example, from 0.5 to 3 parts by weight, per 100 parts by weight of the epihalohydrin rubber.

The basic silica is silica showing basicity that pH of a suspension obtained by suspending silica powder in distilled water in an amount of 5% is from 9 to 13. In the case of using the basic silica as an accelerator, the adding amount thereof is from 2 to 30 parts by weight, for example, from 5 to 20 parts by weight, per 100 parts by weight of the epihalohydrin rubber.

The alkali metal salt of fatty acid means an alkali metal salt of higher fatty acid, resin acid, naphthenic acid or the like, and is preferably an alkali metal salt of higher fatty acid having 6 or more carbon atoms. Specific examples thereof include sodium salt and potassium salt of partially hydrogenated tallowate, stearic acid, oleic acid, sebacic acid and castor oil. Preferred salts include partially hydrogenated tallowate sodium salt, stearin sodium salt, partially hydrogenated tallowate potassium salt, stearin potassium salt. Further preferred salts include stearin sodium salt and stearin potassium salt. Particularly, in the case of using sodium salt such as partially hydrogenated tallowate sodium salt or stearin sodium salt, storage stability is good, which is preferred. In the case of using alkali metal salts of those fatty acids as an accelerator, the adding amount thereof is from 0.2 to 10 parts by weight, for example, from 0.5 to 7 parts by weight, per 100 parts by weight of the epihalohydrin rubber. The acid acceptor preferably applied in the case of using alkali metal salts of those fatty acids as an accelerator is microporous crystal, and particularly preferably synthetic hydrotalcite.

Of the combinations of the acid acceptor (c), the vulcanizing agent (d) and vulcanization accelerator (g), examples of the particularly preferred combination in the invention include the following compositions from the standpoints of storage stability of an unvulcanized rubber composition, vulcanization rate at the time of vulcanizing and heat resistance of a vulcanized rubber.

Synthetic hydrotalcite (c)/6-methylquinoxaline-2,3-dithiocarbonate (d)/DBU-phenol resin salt (g)

Synthetic hydrotalcite and magnesium oxide in combination (c)/6-methylquinoxaline-2,3-dithiocarbonate (d)/DBU-phenol resin salt (g)

Synthetic hydrotalcite (c)/6-methylquinoxaline-2,3-dithiocarbonate (d)/basic silica (g)

Synthetic hydrotalcite (c)/6-methylquinoxaline-2,3-dithiocarbonate (d)/alkali metal salt of fatty acid (g)

Sodium carbonate (c)/polyol type vulcanizing agent (d)/quaternary phosphonium salt (g)

The retarder includes N-cyclohexylthiophthalimide, phthalic anhydride, organozinc compound and acidic silica. The adding amount of the retarder is from 0 to 10 parts by weight, for example, from 0.1 to 5 parts by weight, per 100 parts by weight of the epihalohydrin rubber.

By using the benzimidazole type antioxidant (e) in combination with copper salt of dithiocarbamic acid in the rubber composition for vulcanization of the invention, heat resistance and ozone resistance can further be improved. The benzimidazole type antioxidant used can apply benzimidazoles generally used as a rubber antioxidant, and examples thereof include 2-mercaptobenzimidazole, 2-mercaptomethylbenzimidazole, a mixture of 2-mercaptobenzimidazole and phenol condensate, metal salt of 2-mercaptobenzimidazole, metal salt of 2-mercaptomethylbenzimidazole, 4- and/or 5-mercaptomethylbenzimidazole, and metal salt of 4- and/or 5-mercaptomethylbenzimidazole.

The adding amount of the benzimidazole type antioxidant is from 0.1 to 3 parts by weight, and preferably from 0.2 to 1 part by weight, per 100 parts by weight of the epihalohydrin rubber. Where the adding amount is less than the range, the effect of improving heat resistance is small, and where the adding amount exceeds the range, such an amount is not economical.

Heat resistance of the rubber composition for vulcanization of the invention can further be improved by containing the hindered amine light stabilizer (f) therein. The hindered amine light stabilizer is a compound having at least one piperidine skeleton represented by the following general formula (IV) in the molecule:

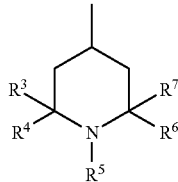

(IV)

wherein $R^3$, $R^4$, $R^5$, $R^6$ and $R^7$ which are the same or different represent hydrogen atom, or a linear or branched alkyl group having from 1 to 5 carbon atoms, which may have a substituent. The compound is widely used as a polymer light stabilizer. Any compound having at least one piperidine skeleton represented by the general formula (IV) in the molecule can be used. In the general formula (IV), the substituent in the alkyl group is not particularly limited, and the substituent may be, for example, an alkyl group, an aryl group or a carboxyl group.

The hindered amine light stabilizer is preferably a compound represented by the following general formula (V):

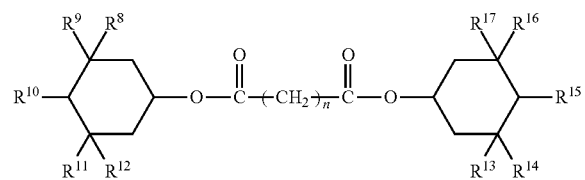

(V)

wherein $R^8$ to $R^{17}$ which are the same or different represent hydrogen atom or a linear or branched alkyl group having from 1 to 5 carbon atoms, and n is an integer of from 2 to 20. The alkyl group may have a substituent.

In the general formula (V), the substituent in the alkyl group is not particularly limited, and may be, for example, an aryl group or a carboxyl group.

Specific examples of the compound having at least one piperidine skeleton represented by the general formula (IV) in the molecule include bis(2,2,6,6-tetramethyl-4-piperidyl) sebacate, bis(1,2,2,6,6-pentamethyl-4-piperidyl)sebacate, 1-[2-[3-(3,5-di-t-butyl-4-hydroxyphenyl)propionyloxy] ethyl]-4-[3-(3,5-di-t-butyl-4-hydroxyphenyl)propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4,5]decane-2,4-dione, dimethyl succinate-1-(2-hydroxyethyl)-4-hydroxy-2,2,6,6-tetramethylpiperidine polycondensate, poly[6-(1,1,3,3-tetramethylbutyl)imino-1,3,5-triazine-2,4-diyl][(2,2,6,6-tetramethyl-4-piperidyl) imino]hexamethylene[(2,2,6,6-tetramethyl-4-piperidyl) imino], poly[(6-morpholino-s-triazine-2,4-diyl)[(2,2,6,6-tetramethyl-4-piperidyl)imino]-hexamethylene[(2,2,6,6-tetramethyl-4-piperidyl)imino]], 2-(3,5-di-t-butyl-4-hydroxybenzyl)-2-n-butylmalonic acid bis(1,2,2,6,6-pentamethyl-4-piperidyl), tetraxy(2,2,6,6-tetramethyl-4-piperidyl)1,2,3,4-butanetetracarboxylate, tetraxy(1,2,2,6,6-pentamethyl-4-piperidyl)1,2,3,4-butanetetracarboxylate, condensate of 1,2,3,4-butanetetracarboxylic acid, 1,2,2,6,6-pentamethyl-4-piperidinol and tridecyl alcohol, condensate of 1,2,3,4-butanetetracarboxylic acid, 2,2,6,6-tetramethyl-4-piperidinol and β,ββ',β'-tetramethyl-3,9-(2,4,8,10-tetraoxalospiro[5,5]undecane)diethanol, N,N'-bis(3-aminopropyl) ethylenediamine.2,4-bis[N-butyl-N-(1,2,2,6,6-pentamethyl-4-piepridyl)amino]-6-chloro-1,3,5-triazine condensate, 1,2,2,6,6-pentamethyl-4-piperidyl methacrylate, and 2,2,6,6-tetramethyl-4-piperidyl methacrylate.

The adding amount of the hindered amine light stabilizer used in the invention is 0.1 to 10 parts by weight, preferably 0.1 to 5 parts by weight, and further preferably from 0.3 to 3 parts by weight, per 100 parts by weight of the epihalohydrin. Where the adding amount is less than the range, the effect of improving heat resistance is small, and where the adding amount exceeds the range, such an amount is not economical.

The conventional antioxidant, ultraviolet absorber and light stabilizer generally used may be added to the rubber composition for vulcanization of the invention according to need. Examples of the conventional antioxidant include amine type, phenol type, thiourea type, special wax type, organic thio acid type and phosphorous acid type antioxidants. Particularly preferred antioxidant is a nickel salt of dialkyl dithiocarbamic acid. In the case that a nickel compound is not used, phenol type, organic thio acid type and phosphorous acid type antioxidants are preferred. The adding amount of the antioxidant is from 0 to 10 parts by weight, preferably from 0 to 5 parts by weight, and further preferably from 0 to 3 parts by weight, per 100 parts by weight of the epihalohydrin rubber. The antioxidant may be used alone or as mixtures of two or more thereof.

The conventional ultraviolet absorbers include salicyclic acid derivatives, benzophenone type and benzotriazole type. The adding amount of those ultraviolet absorbers is from 0 to 10 parts by weight, preferably from 0 to 5 parts by weight, and further preferably from 0 to 3 parts by weight, per 100 parts by weight of the epihalohydrin rubber. The ultraviolet absorber may be used alone or as mixtures of two or more thereof.

The conventional antioxidants are exemplified below.

The nickel salt of dialkyl dithiocarbamic acid includes nickel diethyldithiocarbamate, nickel dibutyldithiocarbamate, and nickel diisononyldihtiocarbamate.

The amine antioxidant includes phenyl-α-naphthylamine, phenyl-β-naphthylamine, p-(p-toluene.sulfonylamide)-diphenylamine, 4,4'-(α,α'-dimethylbenzyl)diphenylamine, 4,4'-dioctyl.diphenylamine, high temperature reaction product of diphenylamine and acetone, low temperature reaction product of diphenylamine and acetone, low temperature reaction product of diphenylamine, aniline and acetone, reaction product of diphenyl amine and diisobutylene, octylated diphenylamine, dioctylated diphenylamine, p,p'-dioctyl.diphenylamine, mixture of octylated diphenylamines, substituted diphenylamine, alkylated diphenylamine, mixture of alkylated diphenylamines, mixture of alkyl- and aralkyl-substituted phenols by aralkylated diphenylamine, diphenylamine derivatives, N,N'-diphenyl-p-phenylenediamine, N-isopropyl-N'-phenyl-p-phenylenediamine, N,N'-di-2-naphthyl-p-phenylenediamine, N-cyclohexyl-N'-phenyl-p-phenylene diamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-(1,3-dimethylbutyl)-N'-phenyl-p-phenylenediamine, mixture of diallyl-p-phenylenediamines, phenyl, hexyl-p-phenylenediamine, phenyl and octyl-p-phenylenediamine. Other amine antioxidant includes condensate between aromatic amine and aliphatic ketone, butyl aldehyde-aniline condensate, polymer product of 2,2,4-trimethyl-1,2-dihydroquinone, and 6-ethoxy-2,2,4-trimethyl-1,2-dihydroquinoline.

The phenol antioxidant includes 2,5-di-(t-amyl)-hydroquinone, 2,5-di-t-butylhydroquinone and hydroquinone monomethyl ether. Monophenol type includes 1-oxy-3-methyl-4-isopropylbenzene, 2,6-di-t-butylphenol, 2,6-di-t-butyl-4-ethylphenol, 2,6-di-t-butyl-4-methylphenol, 2,6-di-t-butyl-4-sec-butylphenol, butyl.hydroxyanisole, 2-(1-methylcyclohexyl)-4,6-dimethylphenol, 2,6-di-t-butyl-α-dimethylamino-p-cresol, alkylated phenol, aralkyl substituted phenol, phenol derivative, 2,2'-methylenebis(4-methyl-6-tert-butylphenol), 2,2'-methylenebis(4-methyl-6-cyclohexylphenol), 2,2'-methylenebis(4-ethyl-6-tert-butylphenol), 4,4'-methylenebis(2,6-di-tert-butylphenol), 2,2-methylenebis(6-α-methylbenzyl-p-cresol), 4,4'-butylidenebis(3-methyl-6-tert-butylcresol), 2,2'-ethylidenebis(4,6-di-tert-butylphenol), 1,1'-bis(4-hydroxyphenyl)cyclohexane, 2,2'-dihydroxy-3,3'-di-(α-methylcyclohexyl)-5,5-dimethyl-diphenylmethane, alkylated bisphenol, butylation reaction product between p-cresol and dicyclopentadiene, 1,3,5-trimethyl-2,4,6-tris(3,5-di-tert-butyl-4-hydroxybenzyl)benzene, 1,3,5-tris(4-tert-butyl-3-hydroxy-2,6-dimethylbenzyl)isocyanurate, 2-tert-butyl-6-(3'-tert-butyl-5'-methyl-2'-hydroxybenzyl)-4-methylphenyl acrylate, 2-[1-(2-hydroxy-3,5-di-tert-pentylphenyl)ethyl]-4,6-di-tert-pentylphenyl acrylate, 3,9-bis[2-{3(3-tert-butyl-4-hydroxy-5-methylphenyl)propionyloxy}-1,1-dimethylethyl]-2,4,8,10-tetraoxaspiro[5,5]undecane, 3,3-bis(3-tert-butyl-4-hydroxyphenyl)ethylene butyric acid ester, 3,5-di-tert-butyl-4-hydroxyhydrocinnamic triester of 1,3,5-tri(2-hydroxyethyl)-s-triazine-2,4,6-(1H,3H,5H)trione, modified polyalkyl phosphorous acid polyphenol chloride, 4,4'-thiobis(6-tert-butyl-3-methylphenol), 4,4'-thiobis(6-tert-butyl-o-cresol), 4,4'-di- and tri-thiobis(6-tert-butyl-o-cresol), bis(3,5-di-tert-butyl-4-hydroxybenzyl)sulfide, 1,1,3-tris(2-methyl-4-hydroxy-5-tert-butylphenyl)butane, 4,4'-butylidenebis(3-methyl-6-tert-butyphenol), 2,2-thiobis(4-methyl-6-tert-butylphenol), n-octadecyl-3-(4'-hydroxy-3',5'-di-tert-butylphenyl)propionate, tetrakis[methylene-3-(3',5'-di-tert-butyl-4'-hydroxyphenyl)propionate]methane, pentaerythritol-tetrakis[3-(3,5-di-tert-butyl-4-hydroxyphenyl)propionate], triethylene glycol-bis [3-(3-tert-butyl-5-methyl-4-hydroxyphenyl)propionate], 1,6-hexanediol-bis[3-(3,5-di-tert-butyl-4-hydroxyphenyl) propionate], 2,4-bis(n-octylthio)-6-(4-hydroxy-3,5-di-tert-butylanilino)-1,3,5-triazine, tris(3,5-di-tert-butyl-4-hydroxylbenzyl)isocyanurate, 2,2-thiodiethylenebis[3-(3,5-tert-butyl-4-hydroxyphenyl)propionate], N,N'-hexamethylenebis(3,5-tert-butyl-4-hydroxy-hydrocinnamide), 2,4-bis[(octylthio)methyl]-o-cresol, 3,5-di-tert-butyl-4-hydroxybenzylphosphonate diethyl ester, tetrakis[methylene(3,5-di-tert-butyl-4-hydroxyhydrocinnamate)]methane, octadecyl-3-(3,5-di-tert-butyl-4-hydroxyphenyl)propionic acid ester, hindered phenol, hindered bisphenol, 2-hydroxynaphthalene-3-carbonyl-2'-methoxyanilide, 2-hydroxynaphthalene-3-carbonyl-2'-methylanilide, 2-hydroxynaphthalene-3-carbonyl-4'-methoxyanilide, 4,4'-bis(N,N'-dimethylamino)triphenylmethane, 2-hydroxynaphthalene-3-carbonylanilide, and 1,1'-bis(4,4'-N,N'-dimethylaminophenyl)cyclohexane.

The thiourea antioxidant includes 1,3-bis(dimethyl aminopropyl)-2-thiourea and tributyl thiourea. The organic thio acid antioxidant includes dilauryl thiodipropionate, distearyl thiodipropionate, dimyristyl-3,3'-thiodipropionate, ditridecyl-3,3'-thiodipropionate, pentaerythritol-tetrakis(β-lauryl thiopropionate), and dilaury thiodipropionate.

The phosphorous acid antioxidant includes tris(nonylphenyl)phosphite, tris(mixed mono- and di-nonylphenyl)phosphite, diphenyl mono(2-ethylhexyl)phosphite, diphenyl.monotridecyl.phosphite, diphenyl isodecyl phosphite, diphenyl isooctyl phosphite, diphenyl nonylphenyl phosphite, triphenyl phosphite, tris(tridecyl)phosphite, triisodecyl phosphite, tris(2-ethylhexyl)phosphite, tris(2,4-di-tert-butylphenyl)phosphite, tetraphenyldipropylene glycol diphosphite, tetraphenyltetra(tridecyl)pentaerithritol tetraphosphite, 1,1,3-tris(2-methyl-4-di-tridecylphosphite-5-tert-butylphenyl)butane, 4,4'-butylidenebis(3-methyl-6-tert-butyl-di-tridecylphosphite), 2,2'-ethylidenebis(4,6-di-tert-butylphenol)fluorophosphite, 4,4'-isopropylidene diphenol alkyl($C_{12}$-$C_{15}$)phosphite, cyclic neopentanetetraylbis(2,4-di-tert-butylphenylphosphite), cyclic neopentanetetraylbis(2,6-di-tert-butyl-4-phenylphosphite), cyclic neopentanetetraylbis(nonylphenylphosphite), bis(nonylphenyl)pentaerythritol diphosphite, dibutylhydrogene phosphite, distearyl pentaerythritol diphosphite, and hydrogenated bisphenol A pentaerythritol phosphite polymer.

The conventional ultraviolet absorbers are exemplified below.

The salicylic acid derivative includes phenyl salicylate and p-t-butylphenyl salicylate. The benzophenone compound includes 2,4-hydroxybenzophenone, 2-hydroxy-4-methoxybenzophenone, 2,2'-dihydroxy-4-methoxybenzophenone, 2,2'-dihydroxy-4,4-dimethoxybenzophenone, 2-hydroxy-4-methoxy-5-sulfobenzophenone trihydrate, 2-hydroxy-4-n-octoxybenzophenone, 2,2',4,4-tetrahydroxybenzophenone, 4-dodecyloxy-2-hydroxybenzophenone, 2-hydroxy-4-acryloyloxyethoxybenzophenone, polymer of 4-(2-acryloyloxyethoxy)-2-hydroxybenzophenone, 3,5-di-t-butyl-4-hydroxybenzoyl acid, n-hexadecyl ester and bis(5-benzoyl-4-hydroxy-2-methoxyphenyl)methane.

The benzotriazole compound includes 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t- octylphenyl)benzotriazole, 2-(2'-hydroxy-3',5'-di-t-amylphenyl)benzotriazole, 2-[2'-hydroxy-3'-(3",4",5",6"-tetrahydrophthalimidomethyl)-5'-methylphenyl]benzotriazole, 2,2'-methylenebis[4-(1,1,3,3-tetramethylbutyl)-6-(2H-benzotriazol-2-yl)phenol, and 2-[2-hydroxy-3,5-bis(α,α-dimethylbenzyl)phenyl]-2H-benzotriazole.

The other ultraviolet absorber includes oxalic anilide derivative, 2,4-di-t-butylphenyl-3,5-di-t-butyl-4-hydroxybenzoate, 2-ethylhexyl-2-cyano-3,3-diphenyl acrylate, 1,3-bis(4-benzoyl-3-hydroxyphenoxy)-2-propyl acrylate, 1,3-bis(4-benzoyl-3-hyroxyphenoxy)-2-propyl methacrylate, 1,3-bis(4-benzoyl-3-hydroxyphenoxy)-2-propyl methacrylate, 2-hydroxy-4-methoxybenzophenone-5-sulfonic acid, methyl o-benzoylbenzoate, ethyl-2-cyano-3,3-diphenyl acrylate, 2-hydroxy-4-benzyloxybenzophenone, [2,2'-thiobis(4-t-octylphenolato)]-n-butylamine nickel[2,2'-thiobis(4-t-octylphenolato)]-2-ethylhexylamine nickel II, and semicarbazone light stabilizer.

The antioxidant and the ultraviolet absorber are not limited to those so long as the effect of the invention is not impaired. In the invention, in the case of using the antioxidant and the like in combination with a copper salt of dithiocarbamic acid, examples of the combination that can obtain particularly preferred effect include a combination of a copper salt of dithiocarbamic acid and nickel dibutyldithiocarbamate, a combination of a copper salt of dithiocarbamic acid, nickel dibutyldithiocarbamate and benzimidazole type antioxidant, and a combination of a copper salt of dithiocarbamic acid, benzimidazole type antioxidant and hindered amine light stabilizer.

Additives other than the above, such as lubricants, fillers, reinforcing agents, plasticizers, processing aids, flame retarders, foaming aids, conductive agents and antistatic agents, can optionally be added to the rubber composition for vulcanization of the invention so long as the effect of the invention is not impaired. Furthermore, the rubber composition for vulcanization of the invention may be blended with rubbers, resins and the like generally used in the art of this field in a range that the characteristics of the invention are not lost.

To produce the rubber composition for vulcanization of the invention, any mixing means used in the field of the conventional polymer processing, for example, mixing roll, Banbury mixer and various kinds of kneaders, can be used. The vulcanized rubber material of the invention is generally obtained by heating the rubber composition for vulcanization of the invention at 100° C. to 200° C. Vulcanization time varies depending on the temperature, but is generally from 0.5 minute to 300 minutes. Vulcanization molding method can be any methods such as compression molding by mold, injection molding, and heating with steam can, air bath, infrared ray or microwave.

The vulcanizate of the invention can widely be applied to the field in which an epihalohydrin rubber is generally used. The vulcanizate is useful as, for example, rubber materials such as various fuel laminated hoses, air laminated hoses, tubes, belts, diaphragms and seals in automotive uses, and rubber materials in general industrial equipments and apparatuses.

The invention is specifically described by reference to Examples and Comparative Examples. However, the invention is not construed as being limited to the Examples so long as the embodiment does not depart from the scope of the invention.

The components of each composition used in the Examples are as follows.

Epihalohydrin rubber 1: Epichlorohydrin-ethylene oxide copolymer, EPICHLOMER C, a product of Daiso Co., Ltd.

Epihalohydrin rubber 2: Epichlorohydrin homopolymer, EPICHLOMER H, a product of Daiso Co., Ltd.

Carbon black: SEAST OS, a product of Tokai Carbon Co., Ltd.

Plasticizer: ADECACIZER RS-107, a product of ADEKA Corporation

Lubricant: SPLENDER R-300, a product of Kao Corporation

Copper salt of dithiocarbamic acid: copper dimethyl dithiocarbamate, NOCCELER TTCu, a product of Ouchi Shinko Chemical Industrial Co., Ltd.

Molybdenum salt of dialkyl thiocarbamic acid, ADEKA SAKURA-LUBE 600, a product of ADEKA Corporation Cobalt salt of dialkyl dithiocarbamic acid: cobalt diethyl dithiocarbamate Benzimidazole type antioxidant: 2-mercaptobenzimidazole, NOCRAC MB, a product of Ouchi Shinko Chemical Industrial Co., Ltd.

Hindered amine light stabilizer: bis(1,2,2,6,6-pentamethyl-4-piperidyl)sebacate, SANOL LS-765, a product of Sankyo Lifetech Acid acceptor, magnesia: magnesium oxide, KYOWAMAG 150, a product of Kyowa Chemical Industry Co., Ltd.

Acid acceptor, hydrotalcite: synthetic hydrotalcite, DHT-4A, a product of Kyowa Chemical Industry Co., Ltd.

Acid acceptor, calcium carbonate: CALCIUM CARBONATE RED POWDER, a product of Shiraishi Kogyo Kaisha, Ltd.

Acid acceptor, sodium carbonate: DYNAMAR RC5251Q, a product of 3M

Accelerator, DBU salt: phenol resin salt of DBU, P-152, a product of Daiso Co., Ltd.

Accelerator, fatty acid sodium salt: sodium tallowate, NS SOAP, a product of Kao Corporation Accelerator, DPG: 1,3-diphenylguanidine, NOCCELER D, a product of Ouchi Shinko Chemical Industrial Co., Ltd.

Accelerator, quaternary phosphonium salt: DYNAMAR FX5166, a product of 3M

Retarder, PVI: N-cyclohexylthiophthalimide, RETARDER CTP, a product of Ouchi Shinko Chemical Industrial Co., Ltd.

Retarder, ZnPDC: zinc N-pentamethylenedithiocarbamate, NOCCELER ZP, a product of Ouchi Shinko Chemical Industrial Co., Ltd.

Retarder, CZ: NOCCELER CZ, a product of Ouchi Shinko Chemical Industrial Co., Ltd.

Quinoxaline type vulcanizing agent: 6-methylquinoxaline-2,3-thiocarbonate, DISONET XL-21S, a product of Daiso Co., Ltd.

Triazine type vulcanizing agent: trimercapto-s-triazine, OF-100, a product of Daiso Co., Ltd.

Polyol type vulcanizing agent: bisphenol AF, DYNAMAR FC5157, a product of 3M

Vulcanizing agent, ETU: ethylene thiourea, ACCEL 22S, a product of Kawaguchi Chemical Industry Co., Ltd.

EXAMPLES

Examples 1 to 16 and Comparative Examples 1 to 8

The components shown in the upper stage (components described upper the item "The above components are kneaded with kneader") of Tables 1, 3, 5 and 7 were kneaded in the proportions shown in each table using a kneader having a volume of 1 liter set at a temperature of 120° C. The kneaded material obtained was taken out of the kneader, and introduced into 7 inches open rolls set at a surface temperature of 70° C. The components shown in the lower stage (components described below the item "The following components are kneaded with roll") of Tables 1, 3, 5 and 7 were introduced in the proportions shown in each table into the open rolls, and the entire mixture was kneaded to prepare an unvulcanized rubber sheet. The unvulcanized rubber sheet obtained was press vulcanized at 170° C. for 15 minutes to obtain a primary vulcanizate having a thickness of 2 mm. The primary vulcanizate was further heated in an air oven at 150° C. for 2 hours to obtain a secondary vulcanizate. Tensile test (initial properties and properties after heating), hardness test, heat resistance and ozone resistance of the secondary vulcanizate were evaluated. The evaluation tests were conducted according to the methods described in JIS K6251, JIS k6253, JIS K6257 and JIS K6259, respectively. The ozone test was conducted under static test conditions of ozone concentration: 50 pphm, temperature: 40° C. and sample elongation: 50%.

The results obtained by each test method are shown in Tables 2, 4, 6 and 8. In the Tables, M100 means tensile stress at an elongation of 100° 1 defined in the tensile test of JIS K6251, TB means tensile strength defined in the tensile test of JIS K6251, EB means elongation at break defined in the tensile test of JIS K6251, and HS means hardness defined in the hardness test of JIS K6253. Furthermore, the symbols in the ozone resistance test mean the following states of cracks in JIS K6259.

Evaluation criteria of the ozone resistance test is as follows.
N-C: No cracks
A-1: Although not visually observed, cracks that can be observed with a magnifying lens of ten times power are present in small numbers.
B-1: Although not visually observed, cracks that can be observed with a magnifying lens of ten times power are present in large numbers.
C-2: Cracks that can visually be observed are present in countless numbers.
C-3: Cracks that are deep and relatively large (smaller than 1 mm) are present in countless numbers.

TABLE 1

(Compound of Examples, amount of component: parts by weight)

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Epihalohydrin rubber 1 | 100 | 100 | 100 | 100 | 100 | 100 | 100 | 100 | 100 |  |
| Epihalohydrin rubber 2 |  |  |  |  |  |  |  |  |  | 100 |
| Carbon black | 50 | 50 | 50 | 50 | 50 | 50 | 50 | 50 | 50 | 50 |
| Plasticizer | 10 | 10 | 10 | 10 | 10 | 10 | 10 | 10 | 10 | 10 |
| Lubricant | 3 | 3 | 3 | 3 | 3 | 3 | 3 | 3 | 3 | 3 |
| Copper salt of dithiocarbamic acid | 0.1 | 0.1 | 0.1 | 0.1 | 0.4 | 0.1 | 0.1 | 0.1 | 0.1 | 0.1 |
| Benzimidazole type antioxidant |  |  | 0.5 | 0.5 | 0.5 |  | 0.5 |  | 0.5 | 0.5 |
| Hindered amine light stabilizer |  |  |  | 1 |  |  |  |  |  | 1 |
| Acid acceptor, magnesia | 3 |  |  |  |  | 3 | 3 |  |  |  |
| Acid acceptor, hydrotalcite | 3 | 3 | 3 | 3 | 3 |  |  |  |  | 3 |
| Acid acceptor, calcium carbonate |  |  |  |  |  | 5 | 5 |  |  |  |
| Acid acceptor, sodium carbonate |  |  |  |  |  |  |  | 12 | 12 |  |
| Accelerator, DBU salt | 1 |  |  |  |  |  |  |  |  |  |
| The above components are kneaded with kneader. |  |  |  |  |  |  |  |  |  |  |
| The following components are kneaded with roll. |  |  |  |  |  |  |  |  |  |  |
| Accelerator, fatty acid sodium salt |  | 3 | 3 | 3 | 3 |  |  |  |  | 3 |
| Accelerator, DPG |  |  |  |  |  | 0.5 | 0.5 |  |  |  |
| Accelerator, quaternary phosphonium salt |  |  |  |  |  |  |  | 1 | 1 |  |
| Retarder, PVI | 1 | 1 | 1 | 1 | 1 | 1 | 1 |  |  | 1 |
| Retarder, ZnPDC | 0.5 |  |  |  |  |  |  |  |  |  |
| Quinoxaline type vulcanizing agent | 1.7 | 1.7 | 1.7 | 1.7 | 1.7 |  |  |  |  | 1.7 |
| Triazine type vulcanizing agent |  |  |  |  |  | 0.9 | 0.9 |  |  |  |
| Polyol type vulcanizing agent |  |  |  |  |  |  |  | 2 | 2 |  |

TABLE 2

(Test results of Examples)

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Initial Properties |  |  |  |  |  |  |  |  |  |  |
| M100 (MPa) | 3.9 | 3.7 | 3.8 | 3.7 | 3.5 | 3.9 | 4.1 | 5.0 | 5.1 | 3.7 |
| TB (MPa) | 13.3 | 12.8 | 12.8 | 12.9 | 12.6 | 10.8 | 10.7 | 13.1 | 13.3 | 11.5 |
| EB (%) | 470 | 480 | 470 | 485 | 500 | 430 | 415 | 280 | 270 | 520 |
| HS (JIS A) | 73 | 70 | 70 | 70 | 70 | 71 | 72 | 75 | 76 | 73 |
| Heat Resistance |  |  |  |  |  |  |  |  |  |  |
| After heat aging at 150° C. for 72 hours |  |  |  |  |  |  |  |  |  |  |
| M100 (MPa) | 4.7 | 4.9 | 5.6 | 5.8 | 5.3 | 5.2 | 5.3 | 6.1 | 6.1 | 6.8 |
| TB (MPa) | 9.0 | 10.8 | 11.5 | 12.5 | 11.4 | 9.1 | 10.8 | 8.8 | 10.6 | 14.6 |

TABLE 2-continued (Test results of Examples)

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| EB (%) | 250 | 220 | 230 | 250 | 255 | 210 | 220 | 205 | 215 | 305 |
| HS (JIS A) | 76 | 74 | 75 | 75 | 75 | 74 | 75 | 77 | 78 | 82 |
| After heat aging at 150° C. for 168 hours | | | | | | | | | | |
| M100 (MPa) | 3.8 | 4.4 | 5.1 | 5.1 | 5.0 | 4.3 | 4.5 | 5.1 | 5.2 | 6.5 |
| TB (MPa) | 7.1 | 8.2 | 8.6 | 9.1 | 8.5 | 6.1 | 7.9 | 6.0 | 7.5 | 12.1 |
| EB (%) | 210 | 175 | 200 | 210 | 220 | 140 | 150 | 155 | 160 | 265 |
| HS (JIS A) | 77 | 75 | 76 | 76 | 76 | 76 | 76 | 79 | 79 | 85 |
| Ozone Resistance | | | | | | | | | | |
| State of sample after 3 days | A-1 | A-1 | N.C. | N.C. | A-1 | A-1 | N.C. | A-1 | N.C. | N.C. |
| State of sample after 7 days | A-1 | A-1 | N.C. | N.C. | B-1 | A-1 | N.C. | A-1 | N.C. | N.C. |

TABLE 3

(Composition of Examples, amount of component: parts by weight)

|  | Ex. 11 | Ex. 12 | Ex. 13 | Ex. 14 | Ex. 15 | Ex. 16 |
|---|---|---|---|---|---|---|
| Epihalohydrin rubber 1 | 100 | 100 | 100 | 100 | 100 | 20 |
| Epihalohydrin rubber 2 | | | | | | 80 |
| Carbon black | 50 | 50 | 50 | 50 | 50 | 50 |
| Plasticizer | 10 | 10 | 10 | 10 | 10 | 10 |
| Lubricant | 3 | 3 | 3 | 3 | 3 | 3 |
| Copper salt of dithiocarbamic acid | 0.01 | 0.03 | 0.06 | 0.15 | 0.4 | 0.1 |
| Benzimidazole type antioxidant | 0.5 | 0.5 | 0.5 | 0.5 | 0.5 | 0.5 |
| Hindered amine light stabilizer | 1 | 1 | 1 | 1 | 1 | 1 |
| Acid acceptor, hydrotalcite | 3 | 3 | 3 | 3 | 3 | 3 |
| The above components are kneaded with kneader. | | | | | | |
| The following components are kneaded with roll. | | | | | | |
| Accelerator, fatty acid sodium salt | 3 | 3 | 3 | 3 | 3 | 3 |
| Retarder, PVI | 1 | 1 | 1 | 1 | 1 | 1 |
| Quinoxaline type vulcanizing agent | 1.7 | 1.7 | 1.7 | 1.7 | 1.7 | 1.7 |

TABLE 4

(Test results of Examples)

|  | Ex. 11 | Ex. 12 | Ex. 13 | Ex. 14 | Ex. 15 | Ex. 16 |
|---|---|---|---|---|---|---|
| Initial Properties | | | | | | |
| M100 (MPa) | 3.9 | 3.9 | 3.8 | 3.7 | 3.6 | 3.6 |
| TB (MPa) | 12.9 | 13.0 | 12.8 | 12.7 | 12.7 | 12.3 |
| EB (%) | 470 | 465 | 480 | 490 | 500 | 510 |
| HS (JIS A) | 70 | 70 | 70 | 70 | 69 | 71 |
| Heat Resistance | | | | | | |
| After heat aging at 150° C. for 72 hours | | | | | | |
| M100 (MPa) | 5.0 | 5.2 | 5.8 | 5.7 | 5.6 | 6.2 |
| TB (MPa) | 10.4 | 11.0 | 12.5 | 12.4 | 12.3 | 13.7 |
| EB (%) | 220 | 220 | 245 | 250 | 245 | 295 |
| HS (JIS A) | 72 | 74 | 75 | 75 | 74 | 79 |
| After heat aging at 150° C. for 168 hours | | | | | | |
| M100 (MPa) | 4.2 | 4.8 | 5.0 | 5.1 | 5.0 | 5.8 |
| TB (MPa) | 7.9 | 8.3 | 9.0 | 8.9 | 8.9 | 11.0 |
| EB (%) | 180 | 185 | 205 | 215 | 220 | 250 |
| HS (JIS A) | 71 | 75 | 76 | 76 | 75 | 81 |
| Ozone Resistance | | | | | | |
| State of sample after 3 days | N.C. | N.C. | N.C. | N.C. | A-1 | N.C. |
| State of sample after 7 days | N.C. | N.C. | N.C. | A-1 | A-1 | N.C. |

TABLE 5

(Composition of Comparative Examples, amount of component: parts by weight)

|  | Com. Ex. 1 | Com. Ex. 2 | Com. Ex. 3 | Com. Ex. 4 | Com. Ex. 5 | Com. Ex. 6 |
|---|---|---|---|---|---|---|
| Epihalohydrin rubber 1 | 100 | 100 | 100 | 100 | 100 | 100 |
| Carbon black | 50 | 50 | 50 | 50 | 50 | 50 |
| Plasticizer | 10 | 10 | 10 | 10 | 10 | 10 |
| Lubricant | 3 | 3 | 3 | 3 | 3 | 3 |
| Copper salt of dithiocarbamic acid |  |  |  | 0.7 | 0.1 |  |
| Molybdenum salt of dialkyl thiocarbamic acid |  |  |  |  | 0.1 |  |
| Cobalt salt of dialkyl dithiocarbamic acid |  |  |  |  |  | 0.1 |
| Benzimidazole type antioxidant |  | 0.5 |  |  |  |  |
| Acid acceptor, hydrotalcite | 3 | 3 | 3 | 3 | 3 | 3 |
| The above components are kneaded with kneader |  |  |  |  |  |  |
| The following components are kneaded with roll |  |  |  |  |  |  |
| Accelerator, fatty acid sodium salt | 3 | 3 | 3 |  | 3 | 3 |
| Accelerator, sulfur |  |  |  | 0.1 |  |  |
| Retarder, PVI | 1 | 1 | 1 |  | 1 | 1 |
| Retarder, CZ |  |  |  | 1 |  |  |
| Quinoxaline type vulcanizing agent | 1.7 | 1.7 | 1.7 |  | 1.7 | 1.7 |
| Vulcanizing agent, ETU |  |  |  | 1.2 |  |  |

TABLE 6

(Test results of Comparative Examples)

|  | Com. Ex. 1 | Com. Ex. 2 | Com. Ex. 3 | Com. Ex. 4 | Com. Ex. 5 | Com. Ex. 6 |
|---|---|---|---|---|---|---|
| Initial Properties |  |  |  |  |  |  |
| M100 (MPa) | 3.9 | 3.9 | 3.2 | 4.3 | 3.8 | 3.8 |
| TB (MPa) | 13.0 | 12.9 | 12.6 | 13.1 | 12.9 | 13.0 |
| EB (%) | 460 | 460 | 535 | 400 | 475 | 490 |
| HS (JIS A) | 70 | 70 | 69 | 73 | 70 | 70 |
| Heat Resistance |  |  |  |  |  |  |
| After heat aging at 150° C. for 72 hours |  |  |  |  |  |  |
| M100 (MPa) | 3.7 | 4.8 | 4.5 | 4.6 | 4.3 | 4.2 |
| TB (MPa) | 5.0 | 6.8 | 8.8 | 8.5 | 8.6 | 8.5 |
| EB (%) | 200 | 150 | 230 | 200 | 270 | 260 |
| HS (JIS A) | 71 | 74 | 74 | 75 | 75 | 74 |
| After heat aging at 150° C. for 168 hours |  |  |  |  |  |  |
| M100 (MPa) | Softening deterioration | — | 3.9 | 3.7 | 3.4 | 3.3 |
| TB (MPa) |  | 4.5 | 5.8 | 4.8 | 5.1 | 5.0 |
| EB (%) |  | 90 | 170 | 150 | 200 | 195 |
| HS (JIS A) |  | 74 | 74 | 76 | 73 | 73 |
| Ozone Resistance |  |  |  |  |  |  |
| State of sample after 3 days | B-1 | A-1 | C-3 | B-1 | B-1 | B-1 |

TABLE 7

(Composition of Comparative Examples, amount of component: parts by weight)

|  | Com. Ex. 7 | Com. Ex. 8 |
|---|---|---|
| Epihalohydrin rubber 1 | 100 | 100 |
| Carbon black | 50 | 50 |
| Plasticizer | 10 | 10 |
| Lubricant | 3 | 3 |
| Acid acceptor, hydrotalcite |  |  |
| Acid acceptor, magnesia | 3 |  |
| Acid acceptor, calcium carbonate | 5 |  |
| Acid acceptor, sodium carbonate |  | 12 |
| The above components are kneaded with kneader. |  |  |
| The following components are kneaded with roll. |  |  |
| Accelerator, fatty acid sodium salt |  |  |
| Accelerator, DPG | 0.5 |  |
| Accelerator, quaternary phosphonium salt |  | 1 |
| Retarder, PVI | 1 |  |
| Quinoxaline type vulcanizing agent |  |  |
| Triazine type vulcanizing agent | 0.9 |  |
| Polyol type vulcanizing agent |  | 2 |

TABLE 8

(Test results of Comparative Examples)

|  | Com. Ex. 7 | Com. Ex. 8 |
|---|---|---|
| Initial Properties |  |  |
| M100 (MPa) | 4.1 | 5.1 |
| TB (MPa) | 10.6 | 13.3 |
| EB (%) | 420 | 295 |
| HS (JIS A) | 71 | 76 |
| Heat Resistance |  |  |
| After heat aging at 150° C. for 72 hours |  |  |
| M100 (MPa) | Softening deterioration | Softening deterioration |
| TB (MPa) |  |  |
| EB (%) |  |  |
| HS (JIS A) |  |  |
| After heat aging at 150° C. for 168 hours |  |  |
| M100 (MPa) | Softening deterioration | Softening deterioration |
| TB (MPa) |  |  |
| EB (%) |  |  |
| HS (JIS A) |  |  |
| Ozone Resistance |  |  |
| State of sample after 3 days | B-1 | B-1 |

In the invention, good heat resistance means that tensile strength Tb after heat resistance test of a secondary vulcanizate is large. In Tables 2 and 4, the vulcanizates of Examples 1 to 18 all show excellent heat resistance and ozone resistance.

Contrary to this, in the compositions of Comparative Examples 1, 2, 5, 6, 7 and 8 that do not contain a copper salt of dithiocarbamic acid which is the essential component of the invention, and the composition of Comparative Example 4 that uses a vulcanizing agent different from the invention, the secondary vulcanizates have poor heat resistance.

In the composition of Comparative Example 3 in which the adding amount of the copper salt of dithiocarbamic acid exceeds the range of the invention, ozone resistance of the secondary vulcanizate is considerably poor.

As is apparent from the comparison between the Examples and the Comparative Examples, the vulcanizate obtained from the composition of the invention have excellent heat resistance and ozone resistance.

The invention claimed is:

1. A rubber composition for vulcanization comprising (a) 100 parts by weight of an epihalohydrin rubber as a rubber component, (b) 0.01 to 0.5 part by weight of a copper salt of dithiocarbamic acid, (c) an acid acceptor, (d) a quinoxaline type vulcanizing agent, and (g) a vulcanization accelerator being either alkali metal salts of fatty acid or 1,8-diazabicyclo (5,4,0)undecene-7 salts.

2. The rubber composition for vulcanization as claimed in claim 1, wherein the quinoxaline type vulcanizing agent (d) is 6-methylquinoxaline-2,3-thiocarbonate.

3. The rubber composition for vulcanization as claimed in claim 1, further comprising a benzimidazole type antioxidant (e).

4. The rubber composition for vulcanization as claimed in claim 1, further comprising a hindered amine light stabilizer (f).

5. The rubber composition for vulcanization as claimed in claim 1, wherein an adding amount of the copper salt of dithiocarbamic acid (b) is from 0.01 to 0.3 part by weight per 100 parts by weight of the epihalohydrin rubber (a).

6. The rubber composition for vulcanization as claimed in claim 5, wherein the adding amount of the copper salt of dithiocarbamic acid (b) is from 0.05 to 0.1 part by weight per 100 parts by weight of the epihalohydrin rubber (a).

7. The rubber composition for vulcanization as claimed in claim 1, wherein the acid acceptor (c) is sodium carbonate.

8. The rubber composition for vulcanization as claimed in claim 1, wherein the acid acceptor is a metal compound and/or inorganic microporous crystal.

9. The rubber composition for vulcanization as claimed in claim 1, wherein the acid acceptor (c) is inorganic microporous crystal selected from the group consisting of synthetic hydrotalcite, Li—Al clathrate compound and synthetic zeolite, or a mixture of the inorganic microporous crystal and a metal compound.

10. The rubber composition for vulcanization as claimed in claim 9, wherein the acid acceptor (c) is synthetic hydrotalcite or a mixture of synthetic hydrotalcite and a metal compound.

11. The rubber composition for vulcanization as claimed in claim 1, wherein the vulcanization accelerator (g) is a sodium salt of fatty acid and/or a potassium salt of fatty acid, and the acid acceptor (c) is inorganic microporous crystal selected from the group consisting of synthetic hydrotalcite, Li—Al clathrate compound and synthetic zeolite.

12. The rubber composition for vulcanization as claimed in claim 11, wherein the vulcanization accelerator (g) is a sodium salt of fatty acid and/or a potassium salt of fatty acid, and the acid acceptor (c) is synthetic hydrotalcite.

13. The rubber composition for vulcanization as claimed in claim 1, wherein the epihalohydrin rubber (a) is an epichlorohydrin homopolymer or a blend of an epichlorohydrin homopolymer and other epihalohydrin rubber, and the blend contains the epichlorohydrin homopolymer in an amount of 70 parts by weight or more.

14. The rubber composition for vulcanization as claimed in claim 1, which does not contain a nickel compound.

15. A vulcanizate obtained by vulcanizing the rubber composition for vulcanization as claimed in claim 1.

16. An automotive rubber part comprising the vulcanizate as claimed in claim 15.

17. The rubber composition for vulcanization as claimed in claim 1, wherein the vulcanization accelerator (g) is 1,8-diazabicyclo(5,4,0)undecene-7 salts.

* * * * *